(12) United States Patent
Saltel et al.

(10) Patent No.: US 10,428,615 B2
(45) Date of Patent: Oct. 1, 2019

(54) DEVICE FOR LINING OR OBTURATING A WELLBORE OR A PIPE

(71) Applicant: Saltel Industries, Bruz (FR)

(72) Inventors: Benjamin Saltel, Cintre (FR); Francois Bajart, Bruz (FR)

(73) Assignee: SALTEL INDUSTRIES, Bruz (FR)

( * ) Notice: Subject to any disclaimer, the term of this patent is extended or adjusted under 35 U.S.C. 154(b) by 80 days.

(21) Appl. No.: 15/319,791

(22) PCT Filed: Jun. 17, 2015

(86) PCT No.: PCT/EP2015/063654
§ 371 (c)(1),
(2) Date: Dec. 18, 2016

(87) PCT Pub. No.: WO2015/193404
PCT Pub. Date: Dec. 23, 2015

(65) Prior Publication Data
US 2017/0138148 A1    May 18, 2017

(30) Foreign Application Priority Data
Jun. 18, 2014   (FR) ...................... 14 55571

(51) Int. Cl.
*E21B 33/12*    (2006.01)
*E21B 43/10*    (2006.01)
(Continued)

(52) U.S. Cl.
CPC ........ *E21B 33/1208* (2013.01); *E21B 33/127* (2013.01); *E21B 43/108* (2013.01); *E21B 2033/005* (2013.01)

(58) Field of Classification Search
CPC ............ E21B 2033/005; E21B 43/103; E21B 43/106; E21B 43/108; E21B 33/124; E21B 33/1208; E21B 33/1277
See application file for complete search history.

(56) References Cited

U.S. PATENT DOCUMENTS 1,776,918 A * 9/1930 MacReady ............ E21B 49/084
166/115
2,143,072 A * 1/1939 Johnson ................ E21B 43/086
138/154
(Continued)

FOREIGN PATENT DOCUMENTS

EP    2096255 A1    9/2009
EP    2644819 A1    10/2013
(Continued)

OTHER PUBLICATIONS

International Search Report dated Aug. 6, 2015 for corresponding International Application No. PCT/EP2015/063654, filed Jun. 17, 2015.
(Continued)

*Primary Examiner* — Jennifer H Gay
(74) *Attorney, Agent, or Firm* — David D. Brush; Westman, Champlin & Koehler, P.A.

(57) ABSTRACT

A device for lining or obturating a wellbore or a pipe. The device includes a tubular radially-expandable lining and at least one ring seal carried by the lining. The seal includes at least one first part formed by a filament or a braid mounted spirally about the external surface of the lining.

16 Claims, 9 Drawing Sheets

(51) Int. Cl.
*E21B 33/127* (2006.01)
*E21B 33/00* (2006.01)

(56) References Cited

U.S. PATENT DOCUMENTS

| | | | | | |
|---|---|---|---|---|---|
| 2,144,026 | A | * | 1/1939 | Park | E21B 33/1208 277/340 |
| 2,670,797 | A | * | 3/1954 | Armentrout | E21B 23/01 166/136 |
| 2,872,230 | A | * | 2/1959 | Desbrandes | E21B 33/1277 166/187 |
| 4,455,027 | A | * | 6/1984 | Baski | F16J 15/46 277/334 |
| 4,676,276 | A | * | 6/1987 | Fawley | F16L 57/00 138/172 |
| 5,383,692 | A | * | 1/1995 | Watts | E21B 17/042 264/145 |
| 5,507,341 | A | * | 4/1996 | Eslinger | E21B 33/1277 166/187 |
| 5,549,949 | A | * | 8/1996 | Williams | C09K 3/10 156/330 |
| 5,579,839 | A | * | 12/1996 | Culpepper | E21B 33/1208 166/118 |
| 5,613,555 | A | * | 3/1997 | Sorem | E21B 33/1277 166/187 |
| 5,702,109 | A | * | 12/1997 | Mahin | E21B 33/1277 166/187 |
| 6,561,229 | B2 | * | 5/2003 | Wellman | F16L 9/14 138/132 |
| 6,564,870 | B1 | * | 5/2003 | Grigsby | E21B 33/12 166/207 |
| 6,679,334 | B2 | * | 1/2004 | Johnson | E21B 7/20 166/207 |
| 6,863,137 | B2 | * | 3/2005 | Terry | E21B 4/18 138/125 |
| 7,428,928 | B2 | * | 9/2008 | Cho | E21B 33/1208 166/135 |
| 7,819,200 | B2 | * | 10/2010 | Cornelissen | E21B 33/1208 166/179 |
| 8,636,074 | B2 | * | 1/2014 | Nutley | E21B 33/1208 166/387 |
| 8,894,069 | B2 | * | 11/2014 | Xu | E21B 33/1277 277/331 |
| 9,284,227 | B2 | * | 3/2016 | Niccolls | B32B 1/08 |
| 9,429,236 | B2 | * | 8/2016 | Castillo | F16J 15/126 |
| 2001/0047871 | A1 | * | 12/2001 | Johnson | E21B 7/20 166/380 |
| 2002/0017333 | A1 | * | 2/2002 | Wellman | F16L 9/14 138/146 |
| 2002/0079043 | A1 | * | 6/2002 | Garneau | B29C 53/8066 156/184 |
| 2002/0189749 | A1 | * | 12/2002 | Shieh | B29C 63/10 156/172 |
| 2003/0106685 | A1 | * | 6/2003 | Salama | E21B 17/01 166/244.1 |
| 2003/0178204 | A1 | | 9/2003 | Echols et al. | |
| 2004/0012198 | A1 | * | 1/2004 | Brotzell | E21B 17/02 285/249 |
| 2004/0084188 | A1 | * | 5/2004 | Salama | E21B 17/01 166/360 |
| 2004/0216871 | A1 | * | 11/2004 | Mendez | E21B 33/1277 166/187 |
| 2005/0082092 | A1 | * | 4/2005 | Hall | E21B 17/003 175/325.1 |
| 2005/0103505 | A1 | * | 5/2005 | Lappin | E21B 33/08 166/387 |
| 2005/0217850 | A1 | * | 10/2005 | Cho | E21B 33/1208 166/285 |
| 2009/0025942 | A1 | * | 1/2009 | Hall | E21B 7/068 166/381 |
| 2009/0101328 | A1 | * | 4/2009 | Leslie | E21B 17/003 166/65.1 |
| 2009/0211770 | A1 | * | 8/2009 | Nutley | E21B 33/1208 166/387 |
| 2010/0206589 | A1 | * | 8/2010 | Cornelissen | E21B 33/1208 166/387 |
| 2011/0031176 | A1 | * | 2/2011 | Knappe | B01D 63/00 210/236 |
| 2011/0073310 | A1 | * | 3/2011 | Clemens | E21B 23/01 166/285 |
| 2011/0280998 | A1 | * | 11/2011 | Lorence | B65D 3/267 426/118 |
| 2012/0291903 | A1 | * | 11/2012 | Ekelund | B29C 53/805 138/97 |
| 2013/0277068 | A1 | * | 10/2013 | Richard | E21B 33/1208 166/387 |
| 2015/0323104 | A1 | * | 11/2015 | Subacchi | F16L 58/1009 138/109 |
| 2016/0097473 | A1 | * | 4/2016 | Lang | E21B 17/02 285/45 |
| 2016/0153246 | A1 | * | 6/2016 | Brown | E21B 47/1015 166/250.12 |
| 2016/0201415 | A1 | * | 7/2016 | Guest | E21B 23/01 166/217 |
| 2016/0265318 | A1 | * | 9/2016 | Greci | E21B 43/08 |
| 2016/0290550 | A1 | * | 10/2016 | Shah | B32B 1/00 |
| 2017/0089167 | A1 | * | 3/2017 | Milh | E21B 33/1277 |
| 2017/0138148 | A1 | * | 5/2017 | Saltel | E21B 33/1208 |
| 2017/0254449 | A1 | * | 9/2017 | Leslie | E21B 17/003 |
| 2017/0335494 | A1 | * | 11/2017 | Kim | D03D 15/02 |
| 2017/0343138 | A1 | * | 11/2017 | Leslie | F16L 25/0018 |
| 2018/0066774 | A1 | * | 3/2018 | Leslie | F16L 13/103 |
| 2018/0087344 | A1 | * | 3/2018 | Cheng | E21B 33/127 |
| 2018/0087350 | A1 | * | 3/2018 | Sherman | E21B 41/00 |
| 2018/0202259 | A1 | * | 7/2018 | Tanguy | E21B 23/06 |
| 2018/0371882 | A1 | * | 12/2018 | Delange | E21B 43/108 |

FOREIGN PATENT DOCUMENTS

| | | |
|---|---|---|
| GB | 2396635 A | 6/2004 |
| GB | 2433761 A | 7/2007 |
| WO | 2011110819 A2 | 9/2011 |

OTHER PUBLICATIONS

Written Opinion of the International Searching Authority dated Aug. 6, 2015 for corresponding International Application No. PCT/EP2015/063654, filed Jun. 17, 2015.
International Preliminary Report on Patentability and English translation of the Written Opinion of the International Searching Authority dated Dec. 20, 2016 for corresponding International Application No. PCT/EP2015/063654, filed Jun. 17, 2015.

\* cited by examiner

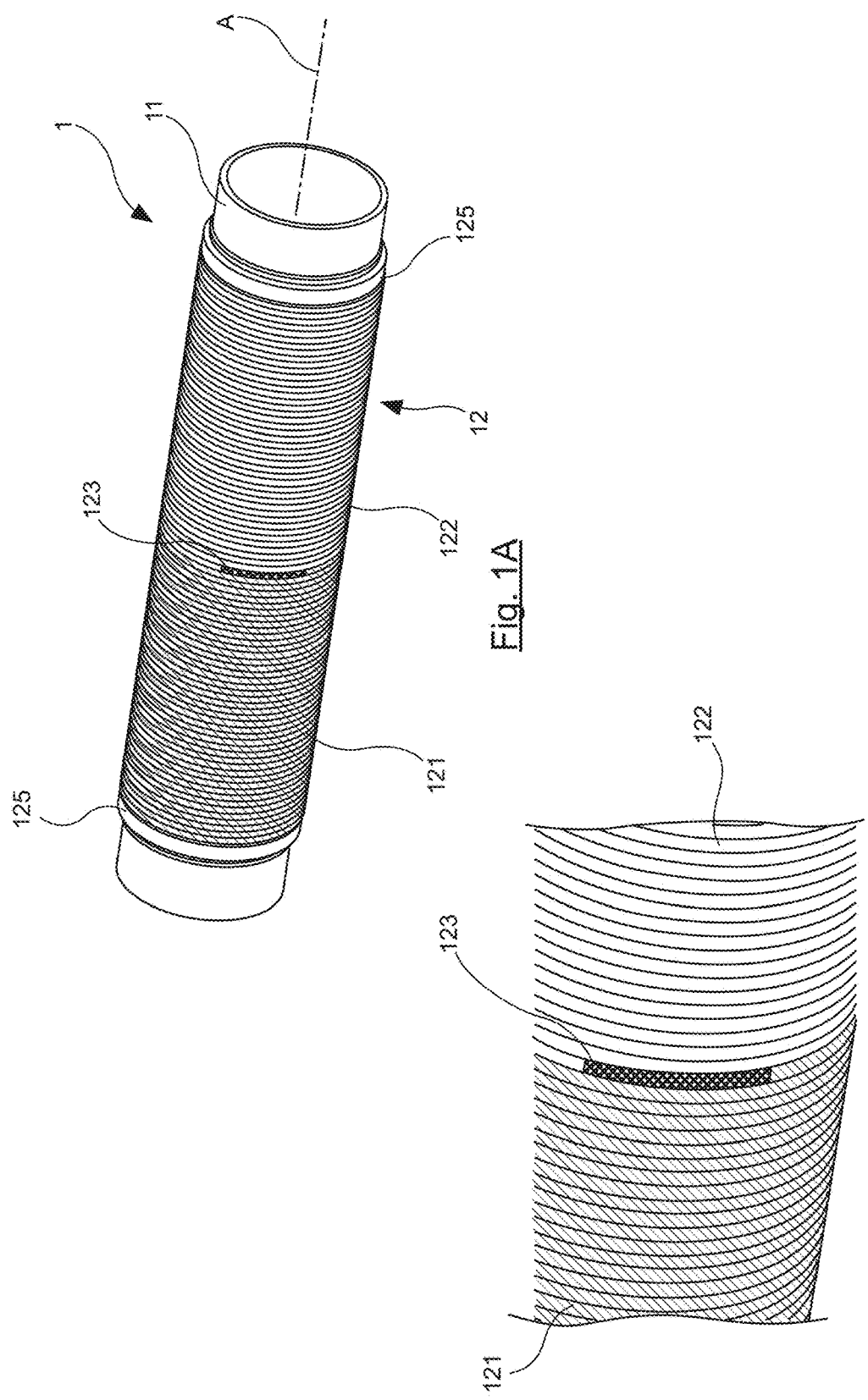

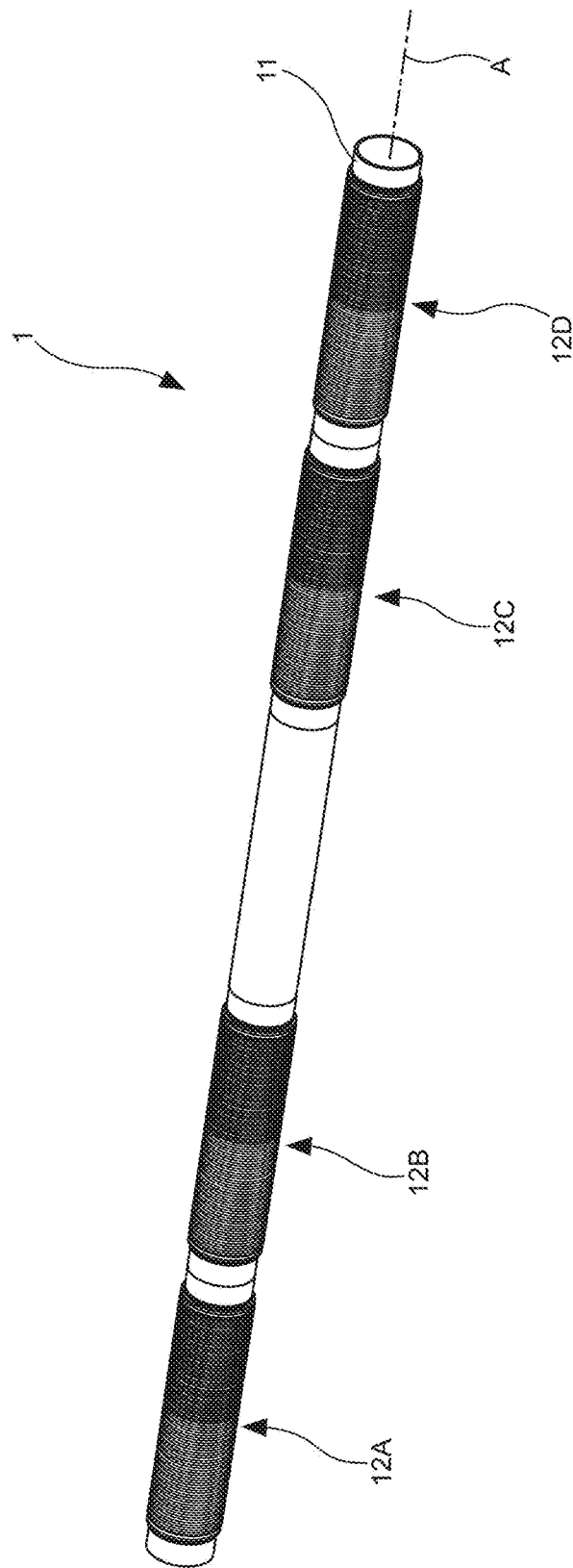

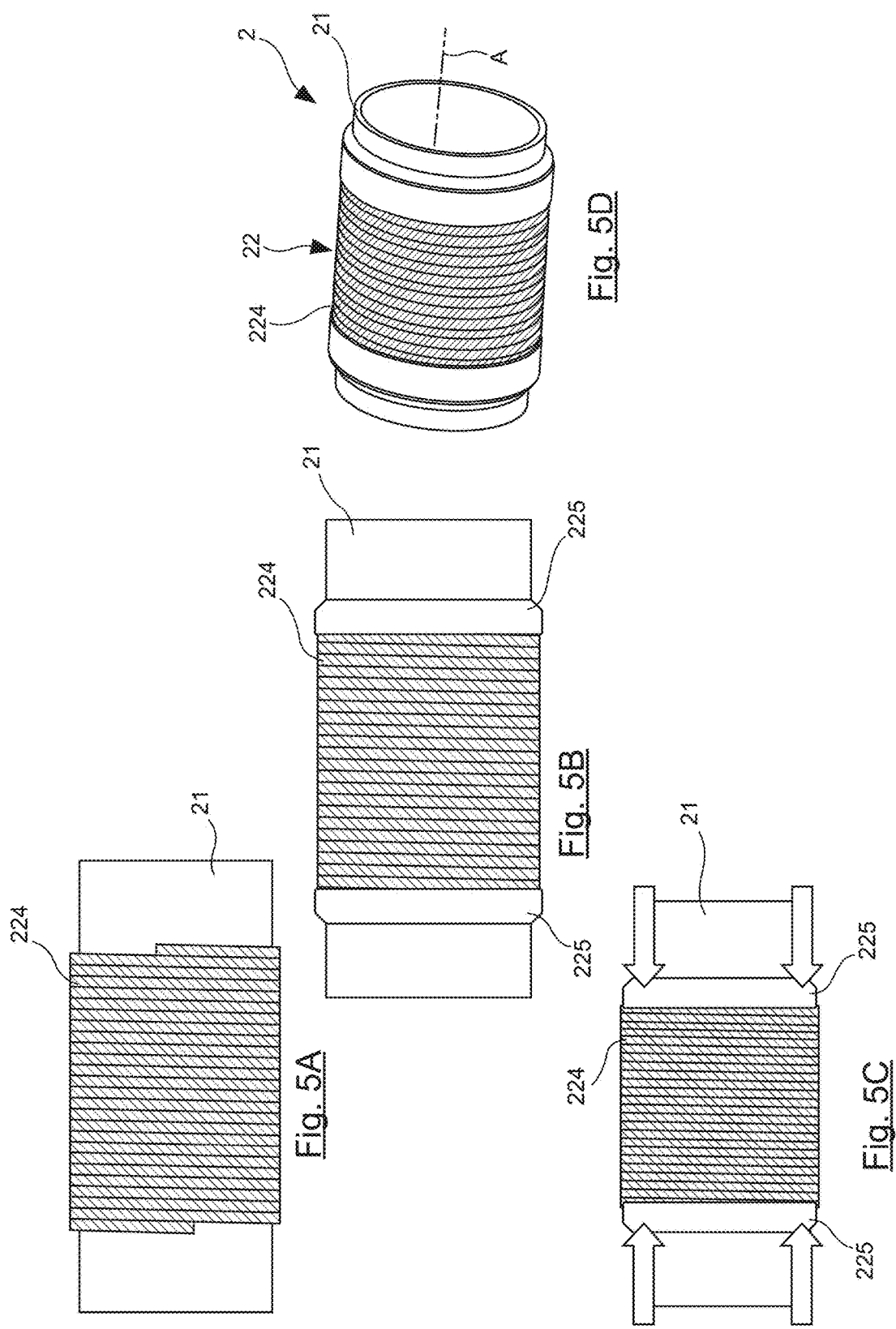

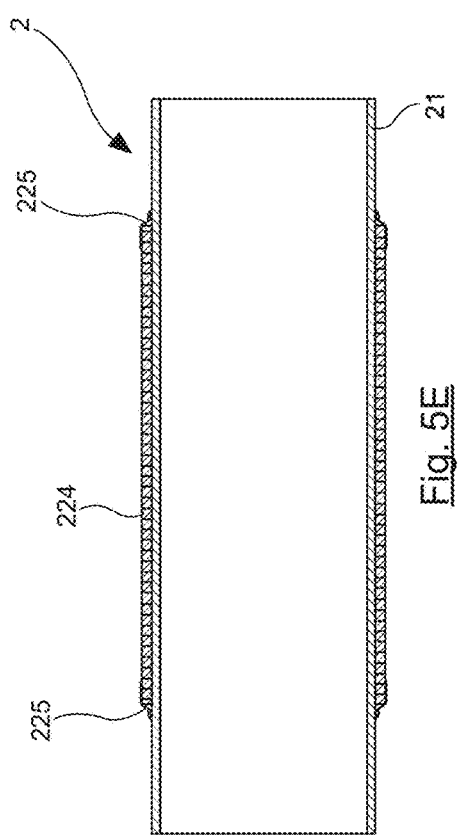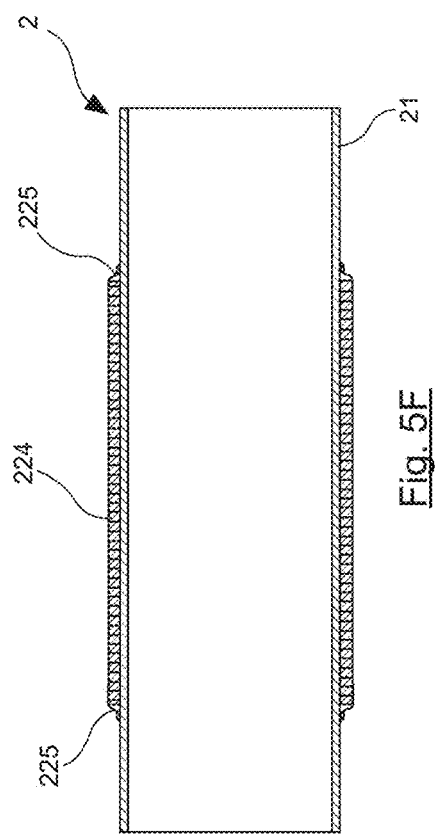

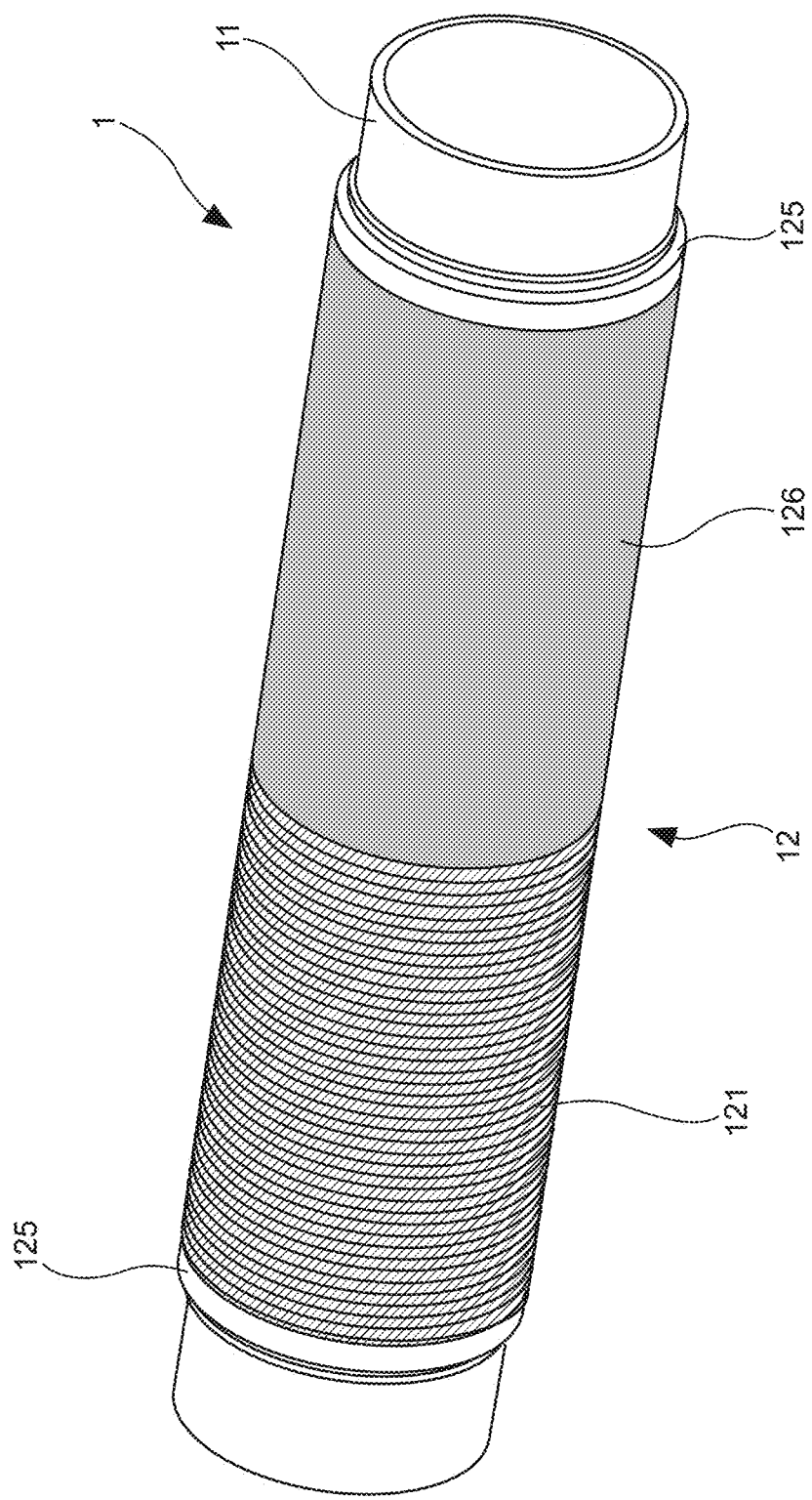

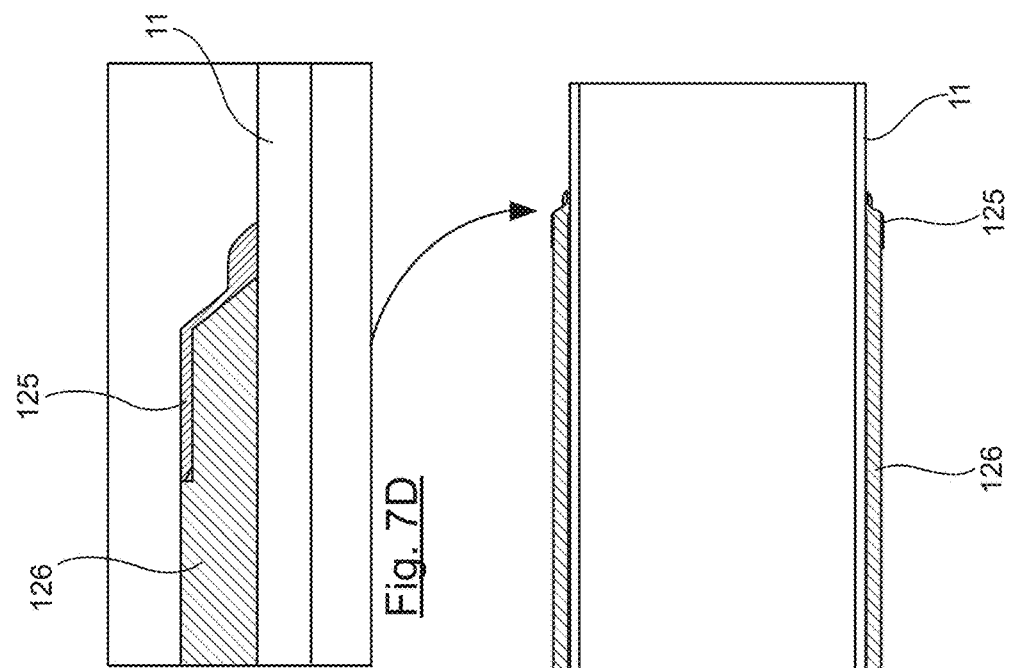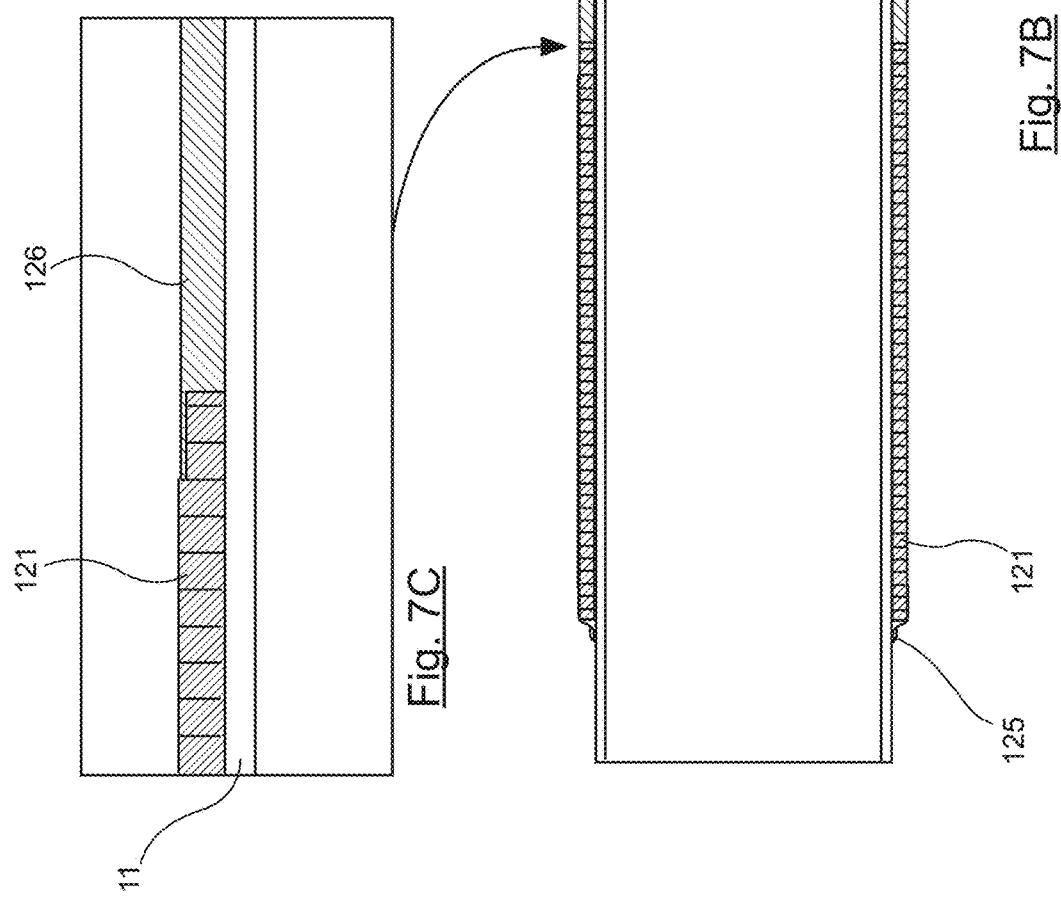

DEVICE FOR LINING OR OBTURATING A WELLBORE OR A PIPE

1. CROSS-REFERENCE TO RELATED APPLICATIONS

This Application is a Section 371 National Stage Application of International Application No. PCT/EP2015/063654, filed Jun. 17, 2015, which is incorporated by reference in its entirety and published as WO 2015/193404 on Dec. 23, 2015, not in English.

2. FIELD OF THE INVENTION

The invention relates to the field of drilling, and especially petroleum and geothermal drilling.

The invention pertains to a device comprising a radially deformable lining intended for tightly sealing or obturating a wellbore or a pipe.

3. PRIOR-ART SOLUTIONS

Here below in the description, the invention shall be described by way of an example in the field of petroleum production.

In petroleum wellbores, there are known ways of using a sleeve or an expandable metal cylindrical tube called a "patch" to ensure that the casing and hence the wellbore are tightly sealed.

It may be recalled that a "casing" or "tubing" is a metal tube which lines the interior of the petroleum wellbore along a length usually ranging from 300 to 4500 meters for an internal diameter generally ranging from 100 to 320 millimeters. This casing is made of segments joined together throughout the height of the wellbore by means of collars.

Such a tight-sealing sleeve has a diameter slightly smaller than the diameter of the casing which is fixed against the internal face of the casing, at the zone to be tightly sealed, by radial expansion. This operation of expansion is achieved in a known way by using conical expansion tools, by hydroforming using a fluid under pressure or again by an expansion vessel called an inflatable packer.

Some of these sleeves have a tight-sealing coating which takes the form an annular layer of flexible and elastic material, made of rubber or elastomer for example. This external coating ensures satisfactory tight sealing between the body of the sleeve and the interior of the casing.

In practice, high-temperature elastomers preserve their properties up to about 325° C.

Consequently, these elastomer sleeves are not suited to tightly sealing wellbores in which the temperatures are above 325° C.

This is especially the case with wellbores in which the extraction of petrol is done by steam injection.

Such a technique called "cyclic steam stimulation" or CSS is used in oil fields containing heavy/viscous petroleum, the injection of steam into the wellbores being intended to heat and reduce the viscosity of the petroleum (so as to fluidize it). After a waiting phase, the liquefied petroleum is pumped towards the surface (production phase). This operating cycle is repeated several times, ten times for example, at high temperatures of 20° C. to 325° C. or more, and high pressures of 210 and 140 bars respectively.

It happens that the high temperatures cause the collars of the casing connecting two casing elements to break. This makes it necessary to tightly seal these portions of the casing wall.

Solutions alternative to that of the elastomer seal have been proposed for high temperatures.

Seals bearing a tight-sealing or packing unit made of metal have thus been proposed.

Although this type of sleeve withstands high temperatures and pressures, it nevertheless has drawbacks, especially in that it is difficult to install and has a big wall thickness (which correspondingly reduces the wellbore section). The tight sealing of such a sleeve is moreover not optimal especially for sealing against gas.

Sleeves bearing a—packing unit made of graphite/carbon have also been proposed.

These materials stand up well to temperature and corrosion. However, their elongation rate is low (below 8% generally), thus reducing the expansion rate of the sleeve and therefore the tight-sealing qualities of the sleeve (as well as the possibilities of mounting the sleeve).

Thus, the current solutions using sleeves adapted to high temperatures and pressures raise problems both in terms of space requirement (for the metal sealing approach) and in terms of elongation rate (for the graphite/carbon sealing approach) and tight-sealing (for the metal, graphite/carbon and elastomer approaches).

4. SUMMARY OF THE INVENTION

The invention fulfils all or part of these goals through a device for lining or obturating a wellbore or a pipe, said device comprising a tubular radially expandable lining and at least one annular seal or ring seal carried by said lining.

According to the invention, said seal comprises at least one first part formed by a filament or a braid mounted spirally about the external surface of said lining.

The invention therefore proposes to dispose a filament or a braid spirally wound on an expandable lining or sleeve to form a seal.

This filament or this braid is wound about the lining along the longitudinal axis of the lining, on only one level (radially to the longitudinal axis of the lining) about the lining.

This enables an efficient fastening of the seal or sealing material during the expansion and during the descent of the device into a wellbore at the desired depth (this phase of descent is called a "run in hole" or RIH).

In the present description and in the claims that follow, the term "wellbore" is understood by convention to refer to a well providing water or hydrocarbons (petroleum or gas especially), whether it is a wellbore with untreated wall or lined by a tubing as well as a pipe serving to transport a fluid.

In the present description and in the claims that follow, the term "filament" is understood by convention to refer to an element (or wire) of a fine and elongated shape. It may for example be a compacted material or compacted strands or sheets made of twisted material.

In the present description and in the claims that follow, the term "braid" is understood by convention to mean two or more filaments that are interlaced.

According to one particular characteristic, said seal comprises a second part formed by a filament or a braid, said second part being mounted spirally about the external surface of said lining and being juxtaposed with the first part following the longitudinal axis of the lining.

According to one particular characteristic, the first part is connected to the second part by linking means.

According to one particular characteristic, said linking means comprise a linking element positioned about the lining and formed by aramid fibers encapsulated in a rubber sheath.

According to one particular characteristic, said linking means comprise a linking ring disposed about the lining between the first part and the second part, and overlapping an end portion of each of the first and second parts.

According to one particular characteristic, said seal comprises a second part formed by a hollow cylindrical element mounted about the external surface of said lining and juxtaposed on the first part along the longitudinal axis of the lining.

According to one particular characteristic, the second part (formed by a filament, a braid or a cylindrical element) has a coefficient of thermal expansion at least ten times greater than that of the first part (formed by a filament or a braid).

According to one particular characteristic, the first part comprises a filament or a braid made of graphite.

According to one particular characteristic, the second part (formed by a filament, a braid or a cylindrical element) is a polymer.

The second part can be made of only PTFE for example.

According to one particular characteristic, the second part is impregnated with graphite.

Thus, the second part can be made of graphite-impregnated PTFE.

According to one particular characteristic, the first part and/or the second part comprise a stiffener element made of carbon, glass fiber, aramid, stainless steel, INCONEL (registered mark) alloy, or a nickel/chromium alloy.

The first part of the seal can thus be formed by a braid made of graphite wires interlaced with wires made out of another material.

The seal can thus be formed by a first braid made of carbon/graphite connected by bonding means to a second braid made of graphite-impregnated polymer.

Through the use of appropriate materials and a combination of filaments or braids wound juxtaposedly on the expandable part of the sleeve, such a device is highly resistant to heat and to high pressures, and preserves optimal properties of tight sealing at high temperatures and pressures.

The sealing means of the device of the invention do not implement any elastomer (the sealing therefore does not rely on an elastomer means, the efficiency of which over time and under severe conditions is uncertain). This gives higher mechanical and chemical resistance over time (with fewer problems of ageing).

Unlike in the case of tight-sealing sleeves or annular barriers made of elastomer, thermal cycling has no influence or little influence on the device of the invention, which is capable of withstanding temperatures of up to 600° C.

Another advantage of such a device is that its wall is thin, thus enabling large passage once it is positioned in the wellbore.

According to one particular characteristic, one or more rubber wires can be integrated into at least one of the braids, preferably at the center, so as to increase the elasticity of the corresponding braid.

According to one particular characteristic, said seal is covered on its periphery, at each of its ends, by a holding ring for holding said seal to the lining.

According to one particular characteristic, at least one of said holding rings is mounted so as to exert a compressive force along the longitudinal axis of the lining on said seal.

Thus, said seal is axially pre-compressed by means of rings disposed at each of its ends. This axial pre-compression enables optimized radial expansion of the seal when the lining is expanded.

According to one particular characteristic, each of said holding rings is fixed to said lining.

Each of said rings is fixed to said lining by soldering or by any other fastening method.

Such an approach enables the expansion by more than 20% of the tight-sealing means which are mounted on the expandable lining of the device.

The rings are fixed to the lining once the pre-compression of the seal has been carried out.

According to one particular characteristic, said lining carries several seals spaced out along the longitudinal axis of the lining.

These seals can be spaced out at intervals that are or are not regular.

According to one particular characteristic, the lining is mounted on and surrounds a tubular part intended to form a part of a conduit of a wellbore/drill hole.

The invention can be applied to tight-sealing sleeves (or patches), the initial diameter of which is smaller than that of the wellbores or of the pipe, and which are deformable by radial expansion beyond their limit of elasticity so that the tight-sealing braid can be applied firmly and intimately against the wall of the wellbore or the pipe, thus tightly sealing the wellbore.

According to one particular characteristic, the lining forms part of a tubular sleeve that is to be placed in a conduit of a wellbore/drill hole.

The invention can also be applied to annular barriers. Such a barrier can comprise a tube to which there is fixed an expandable lining carrying one or more spirally wound juxtaposed braids. The lining is intended to be expanded in an annular space to provide a barrier on either side of this annular space between a casing and a drill hole (i.e. a "rough" or "untreated" drilled hole) or between two concentric casings of a wellbore.

The invention also concerns a method for manufacturing such a device intended to tightly seal or obturate a wellbore or a pipe and comprising a radially expandable lining, said method comprising the following steps:

spirally winding at least one seal about the external surface of said lining;

placing at each end of the seal a holding ring, each ring covering one end of said seal on its periphery;

applying a compressive force to one or to each of said rings, this compressive force being oriented along the longitudinal axis of said lining, towards said seal;

fastening each of said holding rings to said lining;

relaxing the compressive force once the fastening of the rings has been done.

According to one particular characteristic, the method furthermore comprises the following steps:

setting up means that limit the deformation or radial inflation of said seal before the application of a compressive force;

withdrawing said means that limit the deformation or the inflation once the compressive force is relaxed.

These means can take the form of a tensed lining or winding (film) made of a non-elastic material disposed around said seal.

Such an approach gives a rate of expansion of more than 20% for the seal when the lining is expanded and therefore better sealing of the device of the invention.

Indeed, while the lateral compression (along the longitudinal axis of said lining) of the winding forming the seal limits its radial deformation, it compresses the seal in the axial sense of the winding.

5. LIST OF FIGURES

Other features and advantages of the technique described shall appear more clearly from the following description of two preferred embodiments, given by way of a simple, illustrative and non-exhaustive example and from the appended figures, of which:

FIG. 1A is a view in perspective of the lining device of the invention bearing a packer or packer unit according to a first embodiment;

FIG. 1B is a detailed view of the device of FIG. 1A;

Figure 3A:
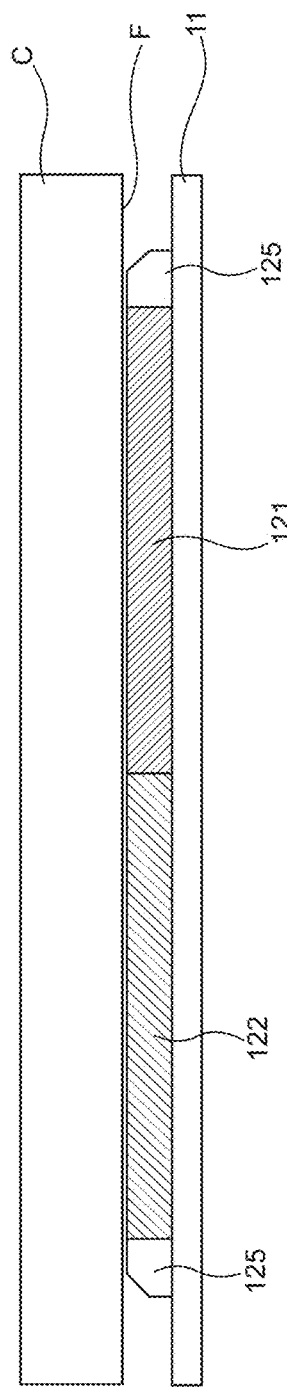
Figure 3B:
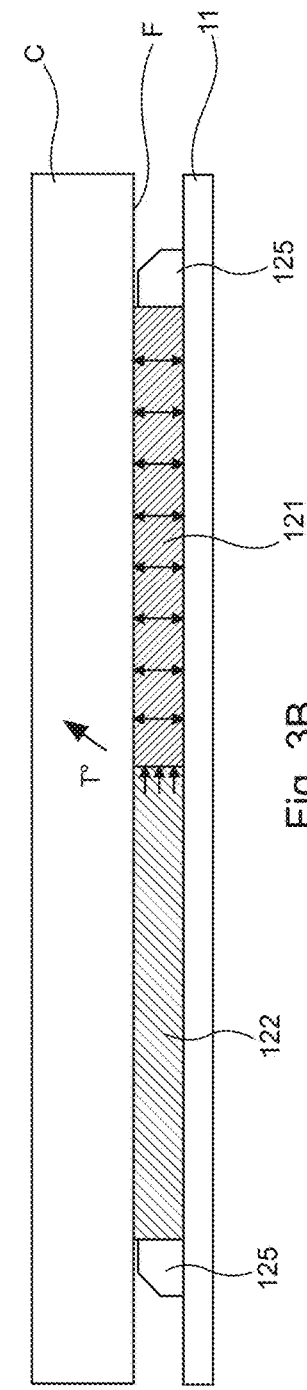
Figure 3C:
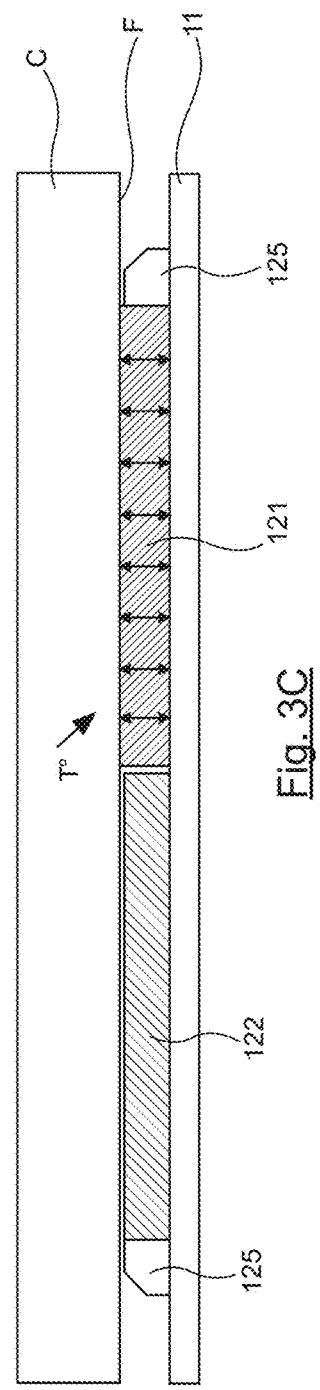
Figure 6A:
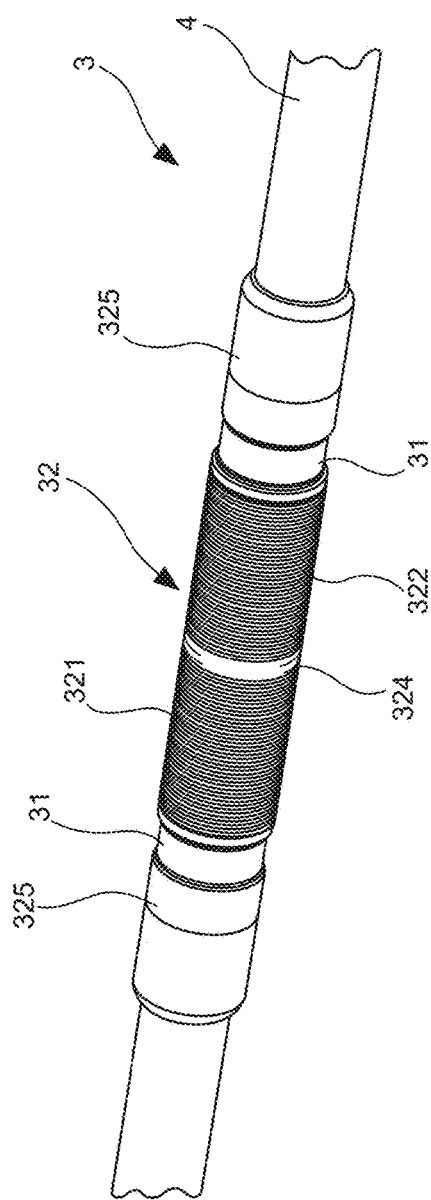
Figure 6B:
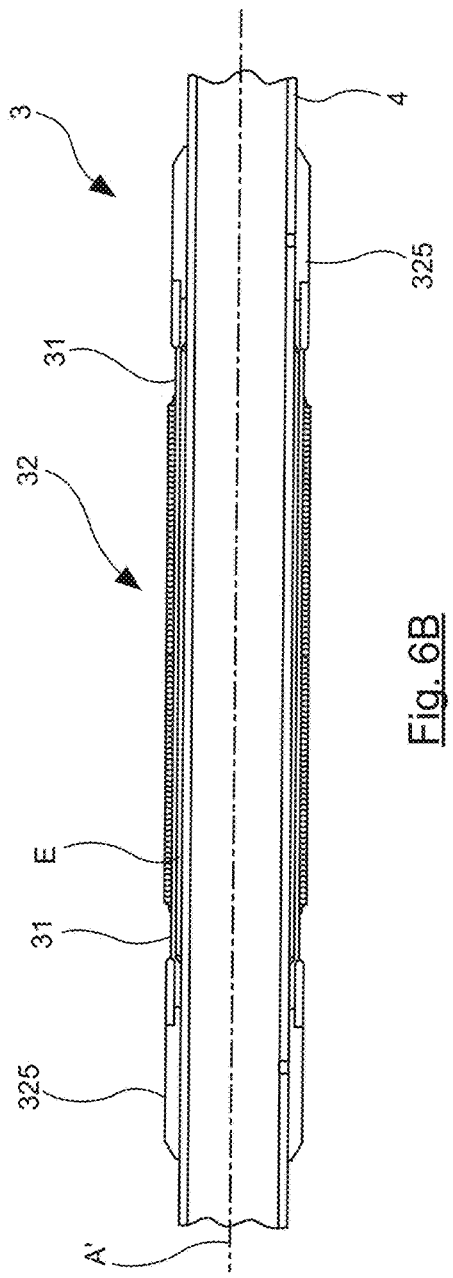

FIGS. 3A to 3C provide a schematic illustration of the thermal expansion of the braids forming the packer unit according to the first embodiment;

FIG. 4 is a view in perspective of the device of the invention provided with several spaced out packer units;

FIGS. 5A to 5F are different views of the device of the invention bearing a packer unit according to a second embodiment;

FIGS. 6A and 6B are views in perspective and in section of the device for obturating according to the invention carrying a packer unit according to the first embodiment;

FIG. 7A is a view in perspective of an alternative lining device described with reference to FIGS. 1A and 1B;

FIG. 7B is a view in longitudinal section of the sleeve of FIG. 7A, FIGS. 7C and 7D being detailed views of FIG. 7B.

6. DESCRIPTION

Here below, we present two embodiments of the sealing means of the device of the invention.

It must be noted that these two embodiments are not limited to a device that is to be expanded in the casing of a so as to seal or lined this wellbore (the device in this case serves as a sealing patch).

The sealing means can also be implemented when the device of the invention serves as an annular barrier that is to be expanded in an annular space to provide a barrier that is to be expanded in an annular space to provide a barrier on either side of this annular space between a casing and a drill hole (i.e. a "rough" drill hole) or between two concentric casings of a wellbore.

6.1 First Embodiment

Referring to FIGS. 1A and 1B, we present a first embodiment in which the device or patch 1 comprises a radially expandable lining or sleeve 11 that is a cylindrical tube made of metal, especially steel, on which a packer unit 12 is mounted.

The metal must be both resistant (mechanically and to corrosion) and sufficiently ductile to be able to be appropriately expanded.

The packer unit 12 is formed by a winding of two braids 121, 122 surrounding the lining 11 and carried by this lining. The ends of the braids 121, 122 are gripped within annular rings 125 which are fixed to the lining 11.

In one alternative, the packer unit 12 is formed by a winding of two filaments that surround the lining 11 and are carried by this lining.

Another alternative is described here below with reference to FIGS. 7A to 7D.

Classically, the lining 11 is expanded by means of an expansion tool (cone, hydroforming tool or inflatable packer) until the packer unit comes into contact with the wall of the wellbore and provides sealing (it plugs a leak for example and enables the wellbore to be repaired).

The two sealing braids 121, 122 are mounted longitudinally (i.e. along the longitudinal axis A of the lining 11) and spirally around the external surface of the metal lining 11, as illustrated in FIG. 1A, each braid winding being in contact with the previous one. The radial winding of each braid 121, 122 is implemented at only one level.

It can be noted that the two braids 121, 122 are juxtaposed and in contact with each other (FIG. 1B). The link between the first braid 121 and the second braid 122 is provided in this example by a braid 123 made of aramid fiber encapsulated in a rubber sheath. This linking braid 123 provides for continuity between the first braid 121 and the second braid 122.

The link between the first braid 121 and the second braid 122 can be provided by another type of fiber or by a mechanical linking element.

Figure 2A:
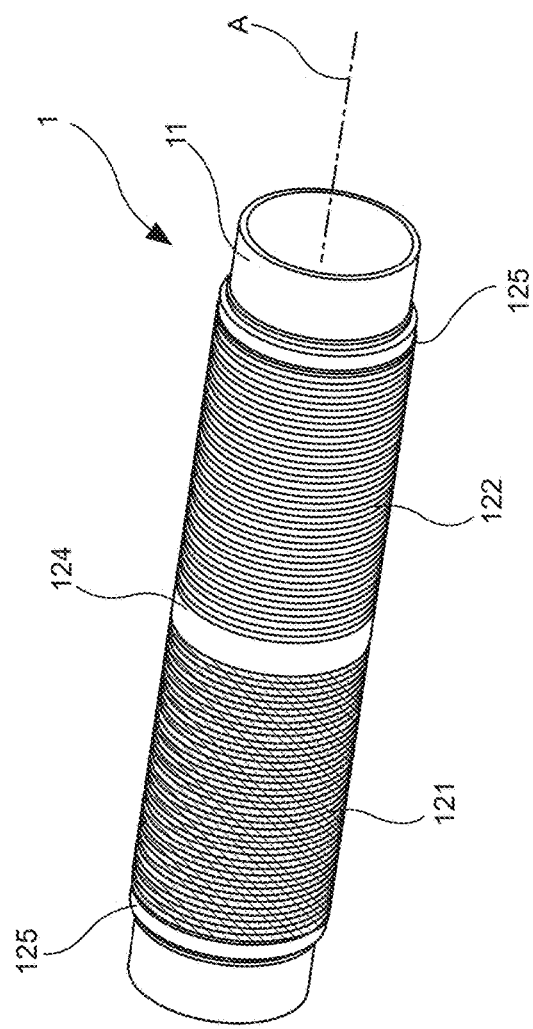
FIG. 2A illustrates a variant of the mounting of the packer unit according to the first embodiment.
Figure 2B:
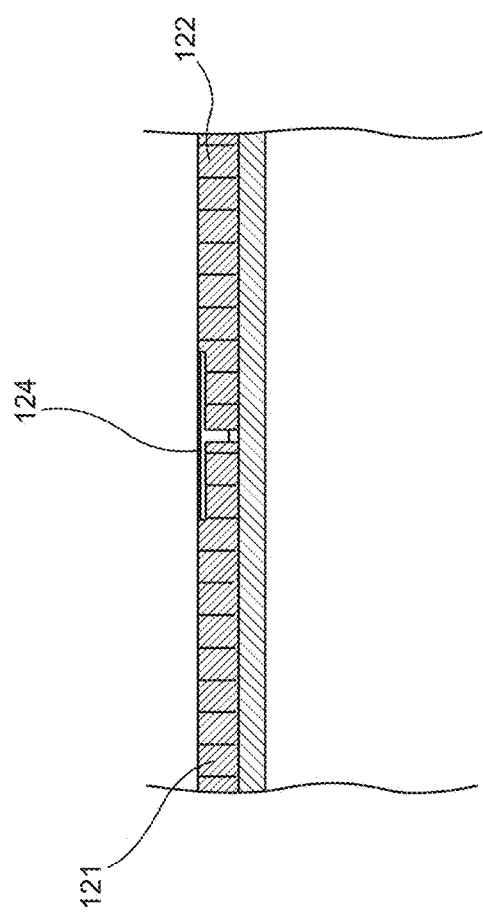
FIG. 2B is a detailed view in section of the device of FIG. 2A.

FIG. 2A is a view in perspective of the expandable sleeve carrying a double braid 121, 122 and a linking ring 124 for the braids 121, 122. FIG. 2B is a detailed view showing the linking ring 124 which covers one end of each of the first and second braids 121, 122, these braids not being in contact with each other.

In this example, the first braid 121 is constituted by carbon filaments and graphite filaments that are intermingled (here below the term used is carbon/graphite braid), the second braid 122 being formed by filaments made of polytetrafluorethylene (abbreviated as PTFE) impregnated with graphite (here below called PTFE/graphite braid).

It is noted that the first braid can be formed by graphite filaments intermingled with carbon, stainless steel, INCONEL (registered mark) alloy or PTFE filaments, and that the second braid can be formed by polymer filaments only, or polymer filaments intermingled with graphite-impregnated, aramid, fiber-glass or nickel-chrome alloy filaments.

It must be noted that polymers other than PTFE can be used in the packer unit 12.

In other words, the packer unit 12 is a deformed hybrid braid formed by two axially juxtaposed (adjacent) and linked braids 121, 122 that form only one winding.

The second braid 122 made of PTFE/graphite has optimal sealing properties because PTFE softens at the service temperature of the patch 1 (i.e. the prevailing temperature in the vicinity of the patch 1 when it is in a wellbore).

In order to avoid any risk of creep (i.e. the irreversible deformation) of this second braid 122, the first braid 121 made of carbon/graphite which is more temperature stable and ensures the stability of the unit (i.e. packer unit 12) is associated with it.

This first braid 121 made of carbon/graphite thus fulfils an anti-extrusion function to eliminate or at least limit the creep of the second braid 122 made of PTFE/graphite.

Contrary to PTFE, carbon/graphite has a low thermal expansion coefficient and practically does not get inflated at high temperatures (the first braid 121 therefore does not help in the sealing at high temperatures, this function being fulfilled by the second braid 122 made of PTFE/graphite).

In other words, to use the patch 1 at high temperature (beyond 330° C.), a stable material (in the form of an adjacent braid 121 made of carbon/graphite) must be associated with the PTFE/graphite braid 122 (which provides the tight sealing), to ensure the temperature stability of the packer unit 12.

It can be noted that PTFE has a high thermal expansion coefficient as compared with carbon/graphite. As a consequence, when the temperature of use of the patch 1 drops, the contraction of the second braid 122 is greater than that of the first braid 121, the latter then having sealing properties superior to those of the second braid 122.

Indeed, this thermal expansion of the braids 121, 122 is illustrated schematically in FIGS. 3A to 3C.

FIG. 3A shows the braids 121, 122 when they are applied in a tightly sealed manner against the internal face or wall F of the casing C at the zone to be sealed, when the lining 11 is expanded.

As illustrated in FIG. 3B, the braids 121, 122 expand when the temperature increases and get placed flat to a greater extent against the wall F, the second braid 122 furthermore compressing the first braid 121 along the longitudinal axis of the lining 11 against the ring 125. When the temperature drops (FIG. 3C), the contraction of the second braid 122 is greater than that of the first braid 121, the first braid 121 then having greater sealing properties than those of the second braid 122.

The packing unit 12 therefore combines the advantage of offering improved sealing quality (thus reducing the rate of leakage) and that of being stable in thermal cycling (high ΔT° C. repeated several times).

FIG. 4 is a view in perspective showing a patch 1 that carries several packer units 12A to 12D, these packer units being possibly disposed at regular intervals (or non-regular intervals) longitudinally (along the axis A). Each packer unit 12A, 12B, 12C, 12D is formed for example by a first carbon/graphite braid and a second PTFE/graphite braid, each of these braids being capable of withstanding high temperatures and pressures.

It can be noted that the first braid 121 of carbon/graphite filaments can withstand high temperatures (of up to 550° C. or 1000° F.), the second braid 122 made of PTFE/graphite can withstand temperatures higher than 300° C. Such braids can withstand pressures of over 210 bars.

In other words, the tight-sealing means of the patch 1 can withstand high temperatures and pressures because of the use of appropriate materials.

These materials furthermore have high mechanical worthiness over time and have low sensitivity or no sensitivity to the temperature cycles (thermal cycling), which makes them particularly suited to the sealing of wellbores in which steam injection (CSS method for example) is used for the extraction of petroleum.

6.2 Second Embodiment

Referring to FIGS. 5A to 5F, we present a second embodiment of the sealing means of the device of the invention in which the device or patch 2 comprises a radially expandable lining 21 which is a cylindrical tube made of metal, especially steel, on which a packer unit 22 is mounted.

The packer unit 22 is formed by a braid 224 surrounding the lining 21 and carried by this lining (FIG. 5D). In one alternative, the packer unit 22 is a filament.

The sealing braid 224 is mounted longitudinally in a spiral about the external surface of the metal lining 21, the radial winding of the braid 24 being implemented on a single level as illustrated in FIGS. 5E and 5F.

In the second embodiment, the braid 224 is mounted on the lining 21 of the patch 2 in such a way as to obtain a rate of elongation of the braid 24 and therefore of the packer unit 22 of the patch 2 which is far greater than the rates of elongation, ranging from 2% to 10%, of the packer units (made of graphite/carbon especially) of the prior-art patches.

FIGS. 5A to 5F provide a schematic illustration of the particular method of installing/mounting the braid 224 on the metal lining 21 of the patch 2 which optimizes the rate of elongation of the braid 224 and provides for improved sealing.

In this example, the braid 224 is made of reinforced graphite.

Once the braid 224 is mounted spirally on the external surface of the metal lining 21 of the patch 2, as illustrated in FIG. 5A, rings 225 are threaded into the lining 21 and attached to each end of the braid 234 to encapsulate the end portions of this braid as shown in FIG. 5B.

FIG. 5E is a view in section showing the rings 225 mounted on the lining 21 and partially covering the braid 224 in its end portions.

As illustrated by the arrows of FIG. 5C, an axial compressive force (along the longitudinal axis A of the lining 21) towards the braid 224 is applied on the two rings 225 so as to compress the braid 224 axially. It can be noted that this axial compression slightly increases the diameter of the packer unit 22 formed by the braids 224.

In one alternative, the axial compressive force is applied only to one of the two rings 225.

The rings 225 are then soldered to the lining 21 and the axial compressive force is relaxed. The braid 224 is thus maintained on the lining 21 by means of the rings 225 which are fixed to the lining 21 (FIG. 5F).

The fact of compressing the spirally mounted braid 224 laterally (along the longitudinal axis of the lining 21) causes compression tangentially (in the sense of the fiber). When the lining 21, and therefore the patch 2, are expanded, the braid 224 is subjected to a tangential tensile force in the reverse direction.

This method of installation enables a rate of elongation of the braid 224 of over 10%, or even about 20%, which increases the rate of expansion of the patch 2 and the possibilities of installing this patch 2.

Just as in the case of the first embodiment illustrated, this second embodiment also makes it possible in a simple way to provide a compact patch, ensuring high sealing quality at high temperatures and pressures (400° C. for example) and showing efficient mechanical behavior over time.

In one particular embodiment (not shown) the lining of the patch carries several braid windings each spaced out and mounted according to the method that has just been described.

The braid 224 can be a braid made of reinforced graphite, stainless steel or INCONEL (registered mark) alloy, the braid being in this case constituted by graphite wires interlaced with stainless steel or INCONEL alloy wires.

In variants, the braid can be a graphite/carbon braid or a graphite/PTFE braid (the PTFE filaments being impregnated with graphite).

6.3 Other Aspects/Variants

It must be noted that the first embodiment and the second embodiment can be implemented independently of each other or in combination.

Thus, the packer element 22 of the second embodiment can be formed by a braid made of two juxtaposed parts and connected by bonding means according to the first embodiment.

In each of the embodiments described here above, the packer unit of the lining can be constituted by several braid windings (called blocks or packings) which are mounted on the external surface of the lining of the patch at regular (or non-regular) intervals.

By way of an example, the lining can carry a series of three windings, 30 cm wide, spaced out at a predetermined distance or else 30 windings, with a width equal to 2 cm and spaced out at a predetermined distance. Each winding comprises a single braid or two braids, connected by bonding means, that are pre-compressed or not pre-compressed by compression rings at their ends.

The braids implemented are preferably square-sectioned.

Each of them can include one or more strands made of rubber which enables the elasticity of the corresponding braid to be increased.

Each part of the packing element can be formed by a filament rather than a braid.

The device of the invention can be implemented in petroleum wellbores or geothermal wellbores. These wellbores can be vertical or inclined.

The device of the invention, the lifetime of which is at least 15 to 20 years, is particularly but not exclusively adapted to CSS wellbores.

FIG. 7A is a view in perspective of an alternative of the lining device described with reference to FIGS. 1A and 1B. The device or patch 1 comprises an expandable sleeve 11. The sleeve 11 carries a single braid 121 forming the first part of the packer unit 12 (it could be a filament in one variant) and an expansion block 126 forming the second part of the packer unit 12.

FIG. 7B is a view in longitudinal section of the sleeve of FIG. 7A, the FIGS. 7C and 7D being detailed views of FIG. 7B.

The expansion block 126 covers an end portion of the braid 121 (FIG. 7C) and is held at the other end by a ring 125 (FIG. 7D) that is permanently fixed to the sleeve 11 (by soldering or any other technique).

The expansion block 126, which is a hollow cylindrical block made of PTFE in this example (with an internal diameter that is slightly greater than the external diameter of the sleeve 11), has a high coefficient of thermal expansion and expands to compress the juxtaposed graphite braid winding 121 (along the longitudinal axis of the sleeve 11) during the rise in temperature (according to the principle described in detailed with reference to FIGS. 3A to 3C).

6.4 Annular Barrier

The sealing means described with reference to the first and second embodiments (when they are implemented in a patch) can be implemented in an isolating/obturating device, or annular barrier).

An isolating device 3 of this kind is shown in FIGS. 6A and 6B in perspective and in section respectively.

In a known way, such an isolating device is supposed to get magnified in an annular space and to form a barrier on either side of this annular space between a tubing (or tubular structure) and an inner wall of a drill hole or between a first tubing and a second tubing which surrounds the first tubing.

In the example shown, the isolating device 3 is mounted on a tubular part 4 (partially shown) which forms part of a tubing of a wellbore.

The isolating device 3 is represented in a non-expanded form in FIGS. 6A and 6B.

When it is expanded, the isolating device 3 isolates for example an annular part of the wellbore in which there prevails a high pressure from anther annular part situated downstream/upstream where a low pressure prevails.

The tubular part 4 is therefore provided along its external face with a metal lining 31 bearing the braid or braids and having ends which are fixedly joined to the external face of the tubular part 4.

More specifically, the ends of the lining 31 are gripped within the annular rings 325.

In the example illustrated in FIGS. 6A and 6B, the lining 31 is provided on its external face with a packer unit 32 formed by two braids 321, 322 juxtaposed along the longitudinal axis A' of the lining 31 (in compliance with the first embodiment) and connected by a connecting ring 324, the braids 321, 322 being capable of tightly sealing the lining 31 when it is deformed and placed flat against the wall of a wellbore or of a tubing (not shown).

In one alternative, the lining 31 is provided on its external face with a pre-compressed braid (in compliance with the second embodiment described here above) capable of ensuring the tight sealing of the lining when it is deformed and placed flat against the wall of a wellbore or a tubing.

The lining 31 is deformed when a fluid (not shown) is injected into the internal space of the tubular part 4 under a predetermined pressure, the fluid passing through an aperture (not shown) which makes the interior of the tubular part 4 communicate with the expandable space E, demarcated by the wall of the tubular part of the tubing, the lining 31 and its ends held by the rings 325.

An exemplary embodiment of the present invention is aimed especially at overcoming all or part of the drawbacks of the prior art.

More specifically, the invention is aimed, in at least one embodiment, at providing a radially deformable device intended to ensure the sealing or obturating of a wellbore or a pipe which:

is simple to implement;

can withstand high temperatures and pressures, and ensure efficient sealing at these temperatures and pressures;

preserves its sealing qualities over a wide range of temperatures and pressures;

has high resistance over time;

is compact and does not greatly reduce the section of the wellbore.

It is another goal of the invention, in at least one embodiment, to provide a device that can be easily deformed and has a high elongation rate, at least greater than 10%.

It is yet another goal of the invention, in at least one embodiment, to provide a device that is particularly suited to the ambient conditions of a CSS wellbore (temperature of 20° C. to at least 325° C., and pressures of 210 to 140 bars respectively), and can withstand several temperature cycles (corresponding to the operating cycles of such a CSS wellbore).

Although the present disclosure has been described with reference to one or more examples, workers skilled in the art will recognize that changes may be made in form and detail without departing from the scope of the disclosure and/or the appended claims.

The invention claimed is:

1. A device for lining or obturating a wellbore or a pipe, said device comprising:
   a tubular radially expandable lining made of metal; and
   at least one ring seal carried by said lining,
   wherein the seal comprises at least one first part and second part each formed by a filament or a braid carried by said lining, the first and second parts being mounted spirally about the external surface of said lining on a single level, and being axially adjacent to one another along a longitudinal axis of the lining.

2. The device according to claim 1, wherein the first part is connected to the second part by a link.

3. The device according to claim 2, wherein the link comprises a linking element positioned about the lining and formed by aramid fibers encapsulated in a rubber sheath.

4. The device according to claim 2, wherein said link comprises a linking ring disposed about the lining between the first part and the second part, and overlapping an end portion of each of the first and second parts.

5. The device according to claim 1, wherein the second part has a coefficient of thermal expansion greater than that of the first part.

6. The device according to claim 1, wherein the first part comprises a filament or a braid made of graphite.

7. The device according to claim 1, wherein the second part consists of polymer.

8. The device according to claim 7, wherein said polymer is Polytetrafluoroethylene (PTFE).

9. The device according to claim 1, wherein the second part is made of Polytetrafluoroethylene (PTFE) impregnated with graphite.

10. The device according to claim 1, wherein at least one of the first part or the second part comprises a stiffener element made of carbon, glass fiber, aramid, stainless steel, or a nickel/chromium alloy.

11. The device according to claim 1, wherein a periphery of said seal is covered, at each of two ends of said seal, by a holding ring for holding said seal to the lining.

12. The device according to claim 11, wherein at least one of said holding rings is mounted so as to exert a compressive force along the longitudinal axis of the lining on said seal.

13. The device according to claim 12, wherein each of said holding rings is fixed to said lining.

14. The device according to claim 1, wherein said lining carries several seals spaced out along the longitudinal axis of the lining.

15. The device according to claim 1, wherein the lining is mounted on and surrounds a tubular part intended to form a part of a conduit of a wellbore/drill hole.

16. The device according to claim 1, wherein said lining forms part of a tubular sleeve that is to be placed in a conduit of a wellbore/drill hole.

* * * * *